(12) United States Patent
Simmons

(10) Patent No.: US 6,862,263 B1
(45) Date of Patent: Mar. 1, 2005

(54) HIERARCHICAL TELECOMMUNICATIONS NETWORK WITH FAULT RECOVERY

(75) Inventor: Jane Marie Simmons, Eatontown, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 10/352,387

(22) Filed: Jan. 27, 2003

Related U.S. Application Data

(63) Continuation of application No. 09/274,188, filed on Mar. 22, 1999, now Pat. No. 6,597,658.
(60) Provisional application No. 60/113,915, filed on Dec. 28, 1998.

(51) Int. Cl.$^7$ .............................. H04M 7/00; H04M 3/00
(52) U.S. Cl. ........................................ 370/217; 370/221
(58) Field of Search ................................ 370/216, 217, 370/221, 225, 228

(56) References Cited

U.S. PATENT DOCUMENTS

| | | | | |
|---|---|---|---|---|
| 4,715,027 A | * | 12/1987 | Mahapatra et al. | ........... 398/87 |
| 4,773,063 A | * | 9/1988 | Hunsperger et al. | ........... 398/87 |
| 4,866,704 A | * | 9/1989 | Bergman | ..................... 370/452 |
| 5,627,889 A | * | 5/1997 | Eslambolchi | .......... 379/221.03 |

* cited by examiner

Primary Examiner—Huy D. Vu
Assistant Examiner—Daniel Ryman

(57) ABSTRACT

The present invention is a telecommunications network having a hierarchical architecture which reduces the amount of equipment and processing required to recover from network failures. In an exemplary embodiment, the nodes of the network are divided into high level nodes and low level nodes. High granularity traffic is collected, routed and manipulated at high level nodes, but generally passes through low level nodes, which generally lack the capability for routing and manipulating such high granularity traffic. Equipment savings results from low level nodes lacking the capability to manipulate traffic other than traffic relevant to those nodes or nearby nodes. Each high level node pair is connected by at least three node disjoint paths of low level nodes and links. Less protection capacity is needed, as each node disjoint path is expected to handle only a portion of rerouted traffic in the event of a network equipment failure. Recovery is decentralized, and is thus faster, requires less equipment, and is less susceptible to the failure of a centralized controller than with networks using centralized recovery processing.

9 Claims, 4 Drawing Sheets

HIERARCHICAL TELECOMMUNICATIONS NETWORK WITH FAULT RECOVERY

CROSS-REFERENCE TO RELATED APPLICATION

This is a continuation of U.S. patent Ser. No.: 09/274,188 filed Mar. 22, 1999, now U.S. Pat. No. 6,597,658 which claims the benefit of U.S. Provisional Application No. 60/113,915 filed Dec. 28, 1998.

BACKGROUND OF THE INVENTION

This invention relates to telecommunications networks. More particularly, this invention relates to an improved network architecture for more effectively and efficiently recovering from failures.

A telecommunications network transports information from a source to a destination. The source and destination may be in close proximity, such as in an office environment, or thousands of miles apart, such as in a long-distance telephone system. The information, which may be, for example, computer data, voice transmissions, or video programming, is known as traffic, usually enters and leaves a network at nodes, and is transported through the network via links and nodes. The overall traffic comprises multiple data streams which may be combined in various ways and sent on common links. Generally, a data stream is a flow of data or information and may comprise multiple component data streams.

Nodes, sometimes termed offices, are devices or structures that direct traffic into, out of, and through the network. They can be implemented electronically, mechanically, optically, or in combinations thereof, and are known in the art. Links connect nodes and transmit data between nodes. A path between any two nodes is a route allowing for data transmission between those two nodes; a path may be one link, or may be comprised of multiple links and nodes and other network elements.

Nodes range in complexity from simple switching or relay devices to entire buildings containing thousands of devices and controls. Nodes can be completely controlled by a central network controller or can be programmed with varying degrees of automated traffic-managing capabilities.

Links are typically either coaxial cable or fiber-optic cable, but can be any transmission medium capable of transporting traffic. Individual links can vary in length from a few feet to hundreds of miles. A link can become inoperative in a number of ways, but most often becomes inoperative as a result of being cut. This may occur, for example, when excavation severs an underground link, or when an automobile accident or storm damages a utility pole carrying a link.

The volume of traffic transported by a network can be significant. Transfer rates for a fiber-optic link may be 20 gigabits per second or more. A gigabit is a billion bits, and a bit is a binary digit (a logical 1 or 0), which is the basic unit of digitized data. Digitized data is a coded sequence of bits, and traffic is typically transported in that form. Data such as audio telephone conversations may be digitally encoded and then transmitted.

Traffic in networks carrying digital data is often circuit switched—for each transmission between two points, a circuit or channel following a path is set up for that traffic. Traffic on a particular circuit in such networks is often sent in one direction only. Thus traffic requiring information to be both sent and received at the same time—for example a telephone conversation, which requires each participant to be able to talk and thus send audio information at the same time—requires two circuits or channels to be established. The two circuits originate and end at the same two points, but may take different paths. Traffic flow through links may be bi-directional, that is, some traffic may flow upstream through a link while other traffic may flow downstream through the same link simultaneously.

Because of the significant volume of traffic typically transported by a network, any disruption in traffic flow can be devastating. Of particular concern are telephone networks, which can transport thousands of individual communications simultaneously. Thus the ability to quickly restore network service should a portion of the network become inoperative is of high priority. Moreover, to ensure that the network is implemented and managed in a cost-effective manner, proper allocation of resources such as link equipment, processing equipment, multiplexers and cross-connects is also of high priority.

Data is typically transmitted and routed at certain standard levels. For example, one two-way phone conversation requires 64 K bits/sec to be transmitted in each direction; this rate is termed DS0. A T1 link carrying a DS1 signal may transmit approximately 1.5 M bits/sec, the data of 24 DS0 circuits. Thus 24 DS0 channels may be combined by a multiplexing device and transmitted as one DS1 channel. A T3 link may transmit the data of 28 T1 links, an OC1 link carries approximately the same amount of data as a T3 link, an OC3 link may transmit the data of 3 OC1 links, an OC12 link may transmit the data of 12 OC1 links, and an OC48 link may transmit the data of 48 OC1 links, or approximately 2.5 gigabits per second. Different types of multiplexers are used to add or remove different sized bundles of traffic from larger bundles of traffic. For instance, a digital access cross-connect system ("DACS") may be used to add (multiplex) or drop (demultiplex) a DS1 channel to or from a DS3 channel.

When used herein, multiplexing is meant to include demultiplexing, and multiplexer is meant to include a device having demultiplexing capabilities. Equipment which adds or drops traffic to or from a link may be called termination equipment.

Fiber optic lines transmit data using light, and multiple wavelengths of light may be transmitted on one fiber optic line as separate channels. Typically, one wavelength of light carries one OC48 link in one direction, and a fiber optic line may carry 8 wavelengths. Thus one fiber optic line may carry 250,000 one way telephone conversations simultaneously.

Data is transmitted, and is added or removed ("dropped") from a data stream, in certain standard units. It is more efficient to transmit, route, add or drop data in larger rather than smaller units. Thus traffic is bundled into the largest unit possible. The size of a bundle, channel or data stream used to transmit data may be termed its granularity—channels of higher capacity have higher granularity.

An add/drop multiplexer ("ADM") may be used to add or remove a wavelength of light from a link. At each node one ADM is required for add/drop capability for each of the multiple wavelengths that may be carried on a fiber optic cable. Multiplexers with the capability to perform add/drop operations on data flow sizes other than wavelengths may be used at nodes. Cross-connects may be used at nodes to switch traffic from one link to another link.

Network architecture (the manner in which nodes and links are configured and traffic is controlled) plays a significant role in both the cost-effective implementation and management of a network and the ability of a network to quickly recover from traffic flow disruptions.

Depending on the configuration of a network and its traffic routing, each node does not require an ADM for all wavelengths that may be carried on a link. If it is determined that a node does not have to access or route traffic on a certain wavelength or channel, or does not need to route traffic among multiple links, that node does not need extra multiplexers or cross-connects. Traffic which may be termed "express" traffic may pass through a node without being demultiplexed or routed by that node.

In one known network, a central controller monitors and controls traffic flow throughout the network, which is organized as a mesh. Complex traffic routing and recovery algorithms are used to manage traffic flow. FIG. 1 is a diagram illustrating a simplified portion of a known mesh network. Mesh network 300 comprises nodes (e.g., nodes 304, 306, 308 and 310) connected by links (e.g., links 305, 307, 311, 312, 314 and 316). Each node in network 300 communicates with controller 302, sending status information and receiving instructions for properly routing traffic. Nodes may communicate with controller 302 via satellite (not shown), by a land link separate from links carrying traffic (not shown), by links carrying traffic, or by other methods. Each node is interconnected with other nodes by links. For example, nodes 304 and 306 are connected by link 305. Links such as links 316 and 314 connect the portion of network 300 shown in FIG. 1 to other portions of network 300. For clarity, not all nodes and links in FIG. 1 are identified with reference numerals.

When a link becomes inoperative, the nodes connected to the link notify controller 302. Controller 302 then determines if an alternative traffic path can be configured and sends messages to certain nodes to route or reroute the traffic. When used herein, "route" and "reroute" refer to setting or altering the path traffic takes. Traffic may be routed on "working" links, which carry network traffic during normal operation and which are typically given excess (or "protection") capacity for use in response to system failures. Typically, a certain percentage of the capacity of each link, for example 50%, is set aside and is not used during normal operation, but is used to route excess capacity during an error condition. Traffic may also be routed on protection links, dedicated links used only to handle rerouted traffic during an error condition or during an excess capacity condition. Since protection links duplicate working links, they may provide 100% excess capacity where they exist.

An error condition is any condition or occurrence that adversely affects the performance of the network or interrupts network flow. For example, an error condition may be the failure of a link or an overload condition.

For example, if in network 300 link 305 should fail, the status of this failure is transmitted to controller 302 by, for example, node 304, node 306, or both. Controller 302 directs that traffic sent between links 304 and 306 be sent along an alternate path; for example via nodes 308 and 310 and links 307, 309 and 311. To effect this change, controller 302 must communicate rerouting instructions to nodes 304, 306, 308 and 310; these nodes must have the capacity to communicate with controller 302 and to manipulate and route the traffic.

In a mesh network such as network 300, typical recovery time from a disruption is on the order of seconds or minutes; quicker recovery times are desirable. In addition, a large amount of extra routing equipment is required in mesh network 300: since each node may be called upon to participate in error recovery, each node must carry routing equipment for this task. Error recovery is typically carried out at a relatively low (i.e., inefficient) granularity or channel size. More protection capacity is required, as protection capacity may not be used efficiently.

In a mesh network, traffic is commonly sent between two nodes via other nodes and links. ADMs and other multiplexers are required at a node only if traffic is to be added or dropped from a link or if the destination of traffic is to be altered depending on changing circumstances. Typically, nodes may add, drop and route traffic which originates or terminates at that node (local traffic) or traffic which does not originate or terminate at that node (express traffic). Larger and more complex multiplexing and cross-linking devices, and more of such devices, are needed if a node is to be able to route express traffic and traffic rerouted as a result of an error. If a bundle of traffic—for example, a wavelength—is sent via a node without having traffic added to or dropped from the bundle, and without the node having the capability to change the destination of the traffic, extra or larger equipment (such as multiplexers or cross-connects) is not required at that node. A bundling or routing scheme which allows wavelengths to bypass intermediate nodes, and which does not require certain nodes to route express traffic, results in significant savings.

To improve recovery times, other known networks have decentralized node control. In these networks, individual nodes, in cooperation with adjacent nodes, routinely route traffic and respond to path failures without significant interaction with a central controller. By communicating locally among themselves, these nodes can, for example, recover from path failures by configuring alternative paths and rerouting traffic to those alternative paths. Existing decentralized node control schemes may improve recovery times to the millisecond range (thousandths of a second), but may result in significant costs. Existing decentralized node control may require a great deal of inter-nodal communication and coordination, which must be supported with increased link capacity and more complex nodes. Each node capable of rerouting must be able to communicate and analyze traffic management communications, and must support expensive routing hardware.

In addition to the extra equipment required for error recovery, existing mesh networks require a certain amount of excess routing equipment (e.g., multiplexers and cross-connects) and excess link capacity for normal operations. Routing and provisioning (re-routing in response to load changes) take place at all nodes. Thus each node requires excess multiplexing and cross-connect equipment even during normal operations.

Networks employing architectures other than mesh configurations are known. Ring networks, for example, interconnect nodes in a circular fashion to form rings. The rings are then interconnected to form a complete network. Each node is connected to its neighboring nodes by a working link and a protection link. In the event that a link between two nodes is severed, the nodes route traffic using the protection links. One known ring network has typical recovery times of less than 50 milliseconds.

FIG. 2 is a diagram illustrating a simplified portion of a known ring network. Network 600 includes nodes 610, 620, 630, 640 and 650. Nodes are connected by working links, indicated by solid lines (such as working link 660), and protection links, indicated by dashed lines (such as protection link 670). For clarity, the working and protection links existing between only one pair of nodes are identified with reference numerals in FIG. 2.

Network 600 recovers from link failure generally as follows: assume the working and protection links between nodes 610 and 620 are cut. Nodes 610 and 620 communicate with each other to transmit disrupted traffic via protection links and via nodes 630, 640 and 650. Recovery traffic is sent on protection links because the capacity of working links is used by normal traffic. Traffic flow is thus restored between nodes 610 and 620 by rerouting disrupted traffic back around the ring through protection links. A network may comprise numerous interconnected rings.

A disadvantage of this ring network is that the ring can recover from only one link failure; more than one link failure requires physical repair to the network to recover traffic flow. This disadvantage is not shared by mesh networks because of their high inter-connectivity. A further disadvantage is the high percentage (100%) of link capacity used for protection, which requires a large resource outlay.

In view of the foregoing, it would be desirable to provide a network architecture for a telecommunications network that provides high levels of restorative capability in a manner which is more cost-effective than existing systems. It would be desirable to provide such a network which requires a lower amount of redundant protection capacity and a smaller amount of routing equipment for error recovery and also during normal operations. It would also be desirable to provide a network architecture that provides fast decentralized restoration ability requiring less inter-nodal communication. It would be still further desirable to provide a network architecture that operates with less complex traffic routing and recovery algorithms.

SUMMARY OF THE INVENTION

The present invention is a telecommunications network having a hierarchical architecture which reduces the amount of equipment and processing required to recover from network failures and to route traffic during normal, non-error operations. A hierarchical architecture is one which divides the network into classes or categories of nodes.

In an exemplary embodiment, the nodes of the network are divided into two classes, high-level nodes (L2 nodes) and low-level nodes (L1 nodes). High granularity traffic is collected, routed and manipulated at L2 nodes but generally passes through L1 nodes, which generally lack the capability for routing such high granularity traffic. Each L1 node may be capable of multiplexing and routing low-level traffic originating from or terminating at the L1 node itself or neighboring L1 nodes. Equipment savings results from L1 nodes lacking the capability to manipulate traffic other than traffic relevant to those nodes or a small number of nearby nodes.

Each L2 node pair is connected by at least three node disjoint paths of L1 nodes and links, where each node disjoint path is comprised of a set of L1 nodes distinct from any other node disjoint path. When a failure occurs on one of the node disjoint paths, the L2 node pair bracketing the path routes some traffic formerly using that path onto the remaining two paths. Less protection capacity is needed, as each node disjoint path is expected to handle only a portion of rerouted traffic in the event of a network equipment failure.

Recovery is decentralized, as recovery decisions are made at the L2 nodes near the error condition, rather than at a central controller. Recovery is thus faster than with a network using centralized recovery processing, requires less equipment, and is less susceptible to the failure of a centralized controller.

DETAILED DESCRIPTION OF THE INVENTION

Overview

Figure 1:
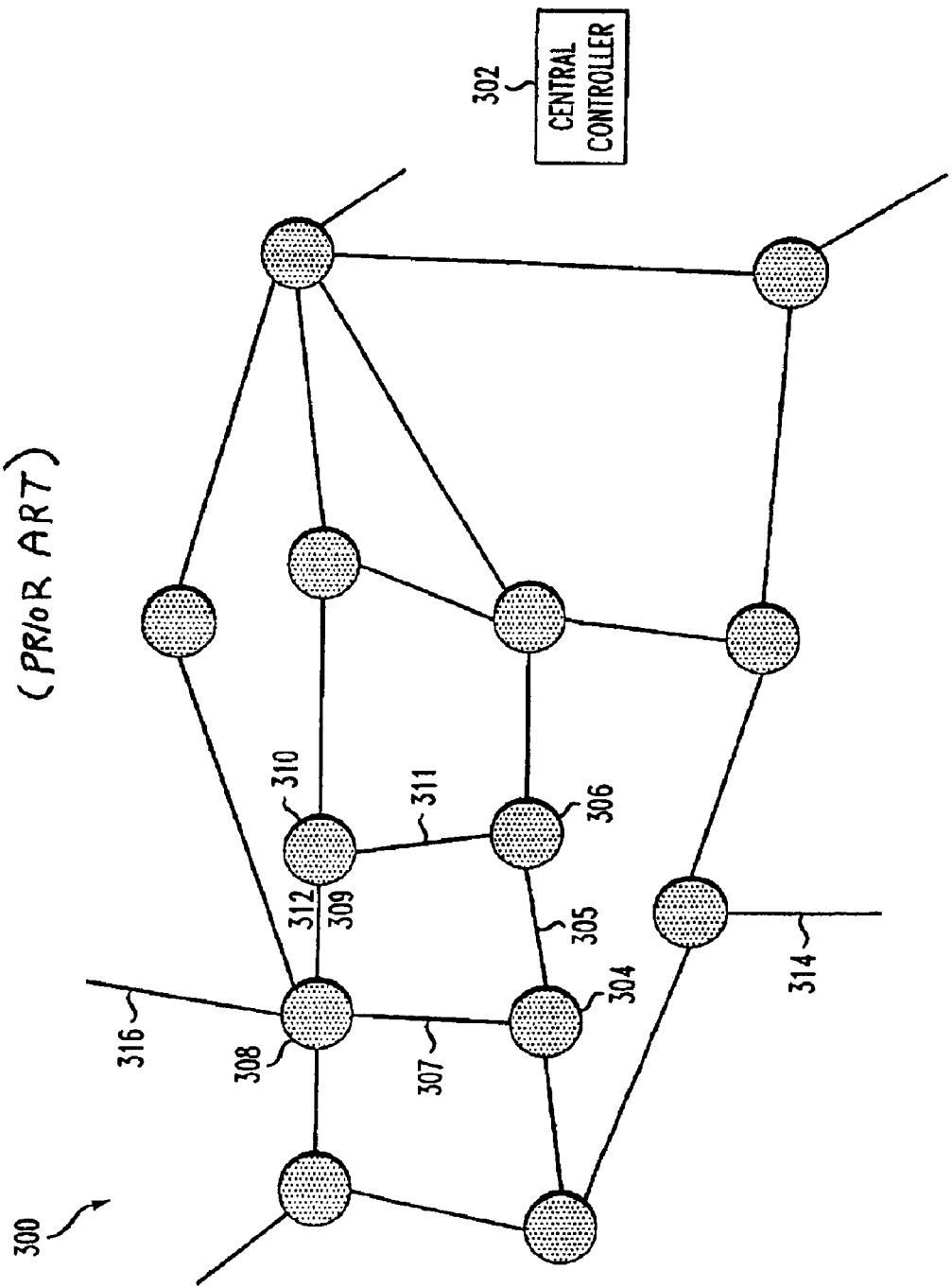
FIG. 1 is a diagram illustrating a simplified portion of a known mesh network.

The present invention is directed to a hierarchical communications network allowing for fast network recovery while making efficient use of network components. An exemplary embodiment of the present invention divides network nodes into two categories (levels), where high-level nodes ("L2" nodes), a minority of the nodes, are primarily responsible for error recovery, and low-level nodes ("L1" nodes) perform minimal error recovery operations. High-level nodes generally have the capacity to perform routing on traffic at high levels of granularity; low-level nodes generally allow such high granularity traffic to pass through the nodes without any routing or manipulation. This architecture allows for recovery from network errors (e.g., the failure of a link) and routing in general to be performed more quickly, using less equipment and without centralized coordination.

In an exemplary embodiment, recovery equipment is concentrated in a small set of nodes (L2 nodes), lowering the amount of such equipment needed. Recovery rerouting is performed largely at L2 nodes which concentrate and bundle traffic into high granularity channels. Thus recovery rerouting is performed on smaller numbers of larger channels of traffic (e.g., OC-48 channels) as opposed to larger numbers of smaller bundles of traffic (e.g., DS-3 channels); such recovery rerouting is efficient in equipment use. Nodes of less capacity (e.g., less multiplexing and cross-connect equipment) may be used as L1 nodes. Accordingly the network is cost effective while still providing a high level of restorative capability.

Each L2 node pair is connected by at least three node disjoint paths of L1 nodes and links, where each node disjoint path is comprised of a set of L1 nodes distinct from any other node disjoint path.

Allowing for at least three paths between L2 node pairs allows for recovery traffic between such a pair to be split among at least two paths. Each path thus needs less recovery transmission capacity, i.e., link capacity. In an embodiment of the present invention where protection fiber separate from working fiber is used, low-level nodes do not require termination equipment to manipulate traffic on the protection fiber.

An exemplary embodiment of the present invention allows for error recovery decisions to be made at the node level, eliminating the need for central error recovery control. This allows for recovery to be faster and eliminates the possibility that the failure of a central controller or of communications with that controller would prevent error recovery. Centralized recovery requires a central bureau to communicate with numerous nodes and to perform a complex recovery algorithm with a large number of rerouting decisions in order to direct recovery. The architecture of the present invention reduces the number of decisions needed, as a smaller number of nodes and channels are involved in rerouting, and allows those decisions to take place in parallel at a local level. Furthermore, the communications links required between each node and the central controller may be eliminated.

In an exemplary embodiment of the present invention, approximately 10% of the network nodes are L2 nodes, and the remainder are L1 nodes. The network recovers in a matter of milliseconds or possibly in several seconds, rather than in minutes.

The network architecture of the present invention divides the nodes of the network into two classes, high-level "L2" nodes, and low-level "L1" nodes. High-level nodes have responsibility for detecting network failures and rerouting traffic accordingly. Low-level nodes have little or no error correction responsibility, but instead report the occurrence of errors to high-level nodes. In an exemplary embodiment of the present invention, approximately 10% of the network nodes are L2 nodes, and the remainder are L1 nodes. While an exemplary embodiment of the present invention defines a two-level hierarchy, alternative implementations are also contemplated which allow for a hierarchy of any number of levels; such deviations do not affect the overall operation or benefits of the network of the present invention.

Generally, L2 nodes are capable of multiplexing and routing traffic at a high granularity, and can handle traffic originating from numerous sources. L1 nodes have less multiplexing and routing capability, and thus less multiplexing and routing equipment.

Nodes in the network are connected by links, allowing communication between nodes.

The network architecture of the present invention provides that every L1 node lies between two L2 nodes—the L2 nodes are the "parent" nodes of the L1 nodes. Thus every link and every L1 node has a parent L2 node.

This architecture allows for any failure to be detected by an L2 node and for the disrupted ("affected") traffic to be routed by the L2 node. L2 nodes are connected by sets of at least three "node disjoint paths"—paths of L1 nodes and links where no L1 node in one path is in another path. Such a path may also be termed a "local path" relative to the two L2 nodes. Generally, L1 nodes in a node disjoint path are capable of rerouting, using a cross-connect, all traffic originating from or terminating at all other L1 nodes in that node disjoint path.

Having at least three node disjoint paths between each L2—L2 pair allows for recovery from an error occurring between the pair to take place between the nodes of the pair with a minimum amount of protection capacity, as rerouted traffic may be divided among at least two different L2—L2 paths. Thus no individual path is required to handle all recovery traffic between the L2—L2 pair. The architecture of the present invention allows for rerouting in response to an error to be achieved using reduced redundancy, where redundancy is expressed as an excess in capacity in paths between nodes.

While for explanatory purposes an exemplary embodiment of the network of the present invention is described where each pair of L2 nodes is connected by three local paths comprising L1 nodes and links, each L1 node is connected to at least two other nodes and each L1 node lies on a local path, alternative implementations are also contemplated which allow for deviations from this explanatory architecture. Such deviations do not affect the overall operation or benefits of the network of the present invention. As discussed below, the hierarchical network of the present invention may be combined with or include other architectures, or be implemented as a piece of another network. Alternate embodiments may organize groups of L2 nodes in a different manner than by pairs.

For example, "spurs" may exist of L1 or L2 nodes which are connected to the main network by only one path; the terminal node in such a spur may be connected to only one other node. Such spurs may not receive the full benefit of the network's error recovery and provisioning capabilities. Some L2 nodes may be connected directly by links, or may be connected by less than three local paths of L1 nodes. If a pair of L2 nodes is connected by only two local paths, on a failure on one of the paths recovery must take place using the other path entirely, or using another path connecting the pair of L2 nodes. If a pair of L2 nodes is connected by only one local path, error recovery between the two L2 nodes must rely on a network path involving other L2 nodes. L1 nodes in a local path may be connected to more than two other L1 nodes in the path; in such a case the local path has parallel paths or a ring. L1 nodes in a local path may be connected to L1 nodes in another local path; in such a case more routing options may be available to the L1 nodes in the local paths and to the parent nodes.

An error affects two types of traffic—express traffic and local traffic. Local traffic with respect to an L2—L2 pair is traffic that originates at or is destined for either of the L2 nodes or any node lying between those nodes. Similarly, local traffic with respect to a node or a local path is traffic that originates in or is destined for the node or path. Express traffic with respect to an L2—L2 pair, a node, or a local path is traffic that passes through the pair, node or local path without originating in or ending in that network component or segment. A link may carry both local and express traffic with respect to a given network component or segment; multiplexers are used to add or remove local traffic from links. In an exemplary embodiment, express traffic is routed by L2 nodes; L1 nodes have no capacity to route (i.e., alter the path of) express traffic. Each L1 node typically is connected to two links, while L2 nodes may have more than two links.

Figure 3:
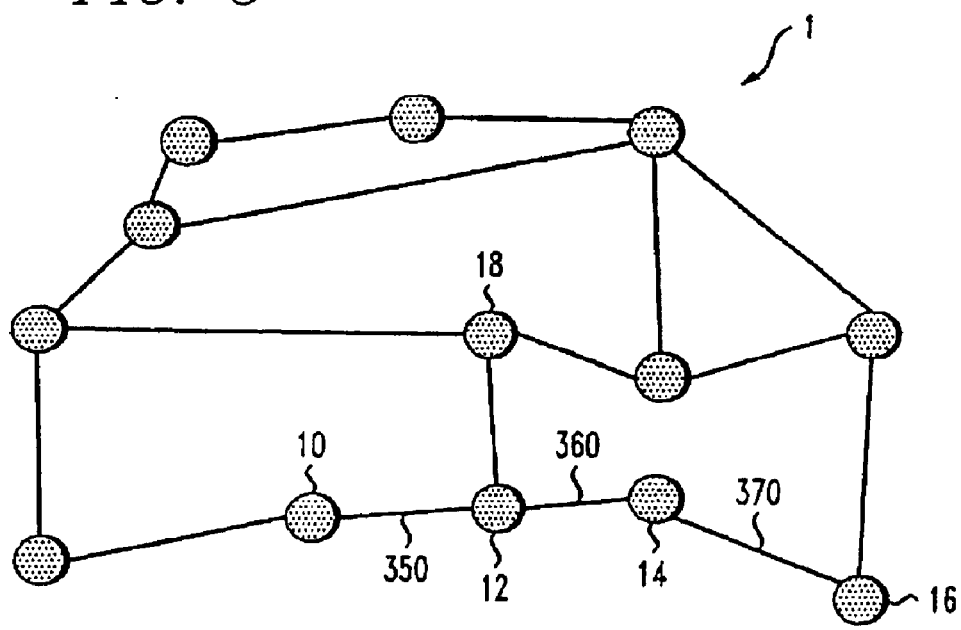
FIG. 3 depicts a high level view of a network for transmitting data according to an exemplary embodiment of the present invention.

FIG. 3 depicts a high-level view of a network 1 for transmitting data according to an exemplary embodiment of the present invention. FIG. 3 depicts only L2 nodes, not L1 nodes. Network 1 includes L2 nodes (such as L2 nodes 10, 12, 14, 16 and 18), for directing traffic into, out of, and through network 1, and for rerouting traffic on error conditions. Network 1 includes L1 nodes, not shown, for directing traffic into, out of, and through network 1. L2 nodes in network 1 are connected by L2 data paths (such as L2 data paths 350, 360 and 370), for transmitting data between L2 nodes. L2 data paths shown in FIG. 3 typically comprise at least three local paths (not shown). For clarity, not all nodes and L2 data paths in FIG. 3 are identified with reference numerals.

Figure 4:
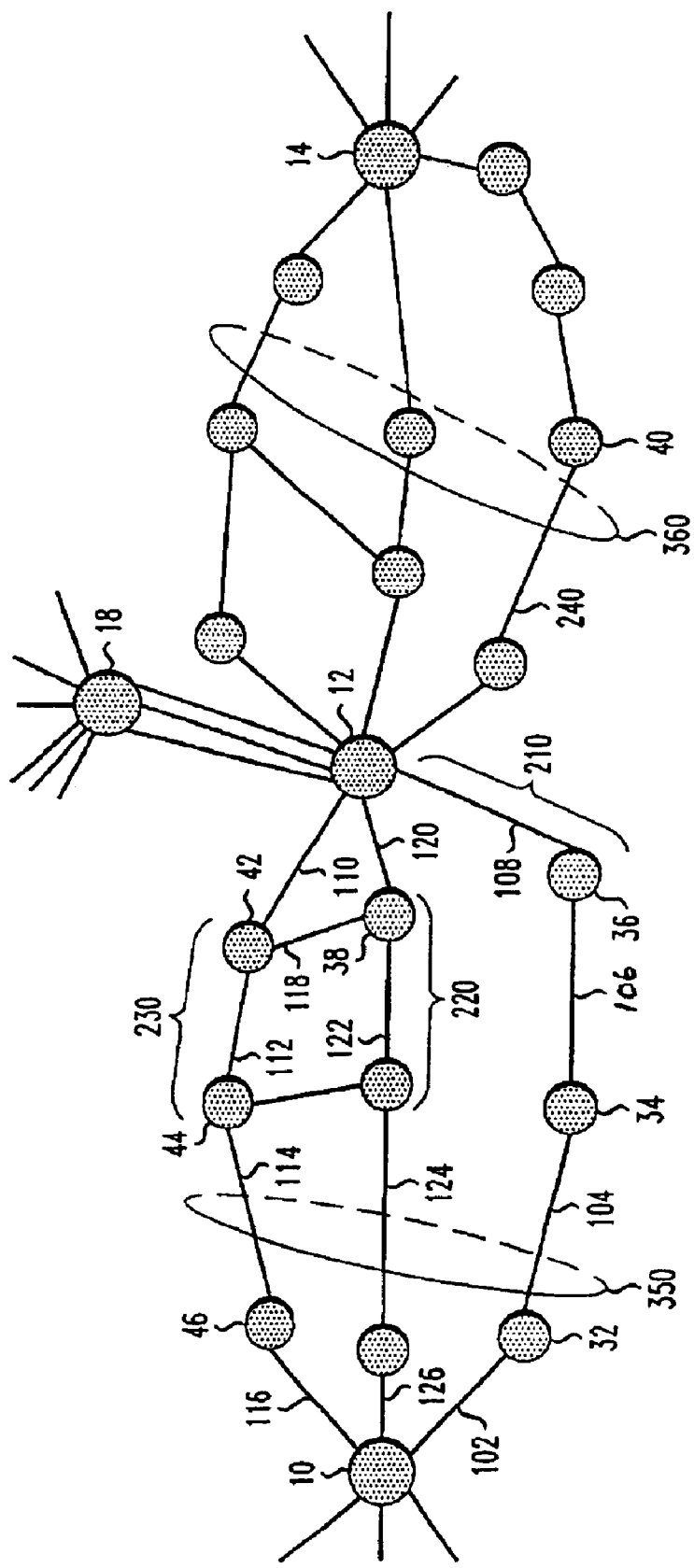
FIG. 4 depicts a detailed view of portion of the network of FIG. 3 according to an exemplary embodiment of the present invention.

FIG. 4 depicts a detailed view of a portion of network 1 of FIG. 3 according to an exemplary embodiment of the present invention. Network 1 includes L2 nodes (such as L2 nodes 10, 12, 14 and 18) for directing traffic into, out of, and through network 1, and for rerouting traffic on error conditions. Network 1 includes L1 nodes (such as L1 nodes 32, 34, 36, 38, 40, 42, 44 and 46) for directing traffic into, out of, and through network 1. The nodes of network 1 are connected by links such as links 102, 104, 106, 108, 110, 112, 114, 116, 120, 122, 124 and 126 for transmitting data between nodes. Combinations of links and nodes connecting L2 nodes form local paths such as local paths 210, 220, 230 and 240, and all the links, nodes or local paths connecting a pair of L2 nodes may be summarized as an L2 data path, such as L2 data paths 350 and 360. For example, local path 210 comprises nodes 32, 34 and 36 and links 102, 104, 106 and 108. L2 data paths shown in FIG. 4 typically comprise at least three local paths. For example, L2 data path 350, connecting L2 nodes 10 and 12 is comprised of three local paths; each of these local paths is in turn comprised of L1 nodes and links. For clarity, not all nodes, links, local paths and L2 data paths in FIG. 4 are identified with reference numerals.

Since traffic on a channel flows in one direction, and at any one time traffic flows into and out of a node, when used herein traffic flowing "between" a first node and a second node is meant to refer both to traffic flowing from the first node to the second node and to traffic flowing from the second node to the first node.

Nodes may communicate non-traffic information (e.g., error, status, routing and command information) with each other via satellite, or by a land link separate from links carrying traffic, by links transmitting traffic or by other methods. Extra equipment is needed for such non-traffic communication to take place; thus it is desirable to reduce the requirements for such communications.

As used herein, the L2 nodes bracketing an error condition or item of equipment are the first L2 nodes reached from each of the multiple paths leading from the site of the error condition or item of equipment. Typically these nodes are the parent L2 nodes of the failed or affected equipment. Thus if an error condition occurs on link 108, the L2 nodes bracketing the error condition are parent L2 nodes 10 and 12. While L2 node 18 is nearer to link 108 than node 10, in that a lower number of hops or links connect link 108 and node 18 than connect link 108 and node 10, node 10 is one node bracketing link 108 and node 18 is not. Node 10 is one of the two first L2 nodes reached along one of the two paths leading away from link 108; the other bracketing L2 node is L2 node 12.

Operation

When a failure occurs in network 1—for example, the severing of a link traffic is routed by L1 and L2 nodes through protection capacity in order to re-connect disrupted communications. In an exemplary embodiment of the present invention, the L2 nodes responding to an error condition are the nodes bracketing the error condition, generally the parent nodes relative to the affected equipment. These nodes typically form an L2 node pair. Traffic is routed at different levels with respect to the L2—L2 pair which are considered parent nodes to the failure. Express traffic passing through the pair is routed by the L2 nodes. Traffic local to the pair is routed by a combination of the L2 nodes constituting the pair and L1 nodes to which the L2 nodes are parent nodes. Both incoming and outgoing traffic must be routed.

Each L1 node ignores express traffic with respect to that local path, i.e., traffic not originating from or terminating at a node in that local path. Such traffic passes through the node without being demultiplexed, altered or rerouted; therefore the node does not need any equipment designed to manipulate the channels on which that express traffic travels. The only equipment in an L1 node used for express traffic is the link itself, which may handle numerous channels without alteration or customization. When a failure occurs on a piece of equipment between a pair of L2 nodes, the L1 nodes lying between the two L2 nodes do not recognize express traffic which stops flowing due to the failure or which is rerouted through those nodes due to the failure. The rerouted traffic flows through the L1 nodes without being "seen" or manipulated by those nodes.

In an exemplary embodiment of the present invention, the failure is reported to or detected by the two L2 parent nodes bracketing the path in which the failure occurred. A portion of the express traffic routed through the two L2 nodes may have been routed on the affected path. In response to a failure, this traffic is divided among the at least two other local paths lying between the two L2 nodes. Referring to FIG. 4, express traffic passing through the L2—L2 pair comprised of nodes 10 and 12 may flow in to the pair via node 10, flow to node 12 via a combination of local paths 210, 220 and 230, and leave the pair via node 12. None of the L1 nodes between the pair participate in routing of the express traffic, as none of these nodes access the express traffic and alter the path of that traffic. Such traffic passes through such nodes unrecognized, without being demultiplexed by those nodes.

Traffic local to the nodes bracketed by the L2—L2 pair is first routed by the L1 nodes within the pair, then routed by the parent L2 nodes. This traffic, and recovery traffic in general, is divided among the at least two unaffected node disjoint paths between the L2 node pair. Having L1 nodes generally responsible for rerouting only local traffic, and having L1 nodes reroute that traffic only as far as parent L2 nodes, lowers the amount of equipment needed at L1 nodes.

In an exemplary embodiment, the two nodes adjacent to a failure of a network component (the "adjacent" nodes) route traffic local to the local path on which the failure sits. Affected traffic originating at an adjacent L1 node is routed to flow along a path from that L1 node to one L2 node of the parent pair, then possibly to the other L2 node of the pair (in the form of express traffic), then to the destination for the traffic. Local traffic destined for the affected L1 node is routed along the same path, in the reverse direction. Disrupted traffic originating at a non-adjacent L1 node on the local path travels from the affected L1 node to an L1 node adjacent to the failure, and then is turned around by that adjacent node and sent back through the affected L1 node to a parent L2 node for rerouting. Traffic terminating at such a non-adjacent node is routed similarly. L1 nodes generally need cross-connects but not multiplexers for such local path rerouting.

Note that not all traffic on a local path experiencing a failure is disrupted by the failure.

An embodiment of the architecture of the present invention may allow a network to recover from the failure of an L2 node. L2 nodes to which the failed L2 node are connected (typically by local paths) accept and route traffic normally handled by the L2 node. L1 nodes unable to transmit traffic as a result of the L2 node failure perform local recovery as described below, with respect to the failure of a link. Other embodiments may recover from the failure of an L2 office in other manners. For example, certain L1 nodes may be designated as backup L2 nodes, and augmented with extra equipment (multiplexers and cross-connects). Such backup nodes function as L2 nodes in the event of the failure of an L2 node.

Another embodiment allows for the recovery from the failure of an L2 node by arranging the L2 nodes themselves in super-rings. L2 nodes are arranged so that each L2 node is a member of a ring formed from L2 nodes; each component L2 node is connected to its neighboring ring nodes either by a direct link or a path involving L1 nodes. If a pair of component L2 nodes is connected via a path using intermediate nodes, they may communicate traffic on an express level, eliminating the need for extra equipment in the nodes along the path.

The architecture of network 1 and the steps taken for recovery are described with respect to FIG. 4 and the following example.

During normal operation of network 1, express traffic flows between L2 node 10 and L2 node 12 via three local paths (node disjoint paths) 210, 220 and 230, without being manipulated by or accessed by the local nodes comprising the local paths. Link 350 (FIG. 4) comprises local paths 210, 220 and 230. Express traffic may be divided between the three local paths 210, 220 and 230. Local traffic flows between two L1 nodes on a local path or between one of those nodes and one or both of parent L2 nodes 10 and 12. For example, local traffic from L1 node 32 to L1 node 34 is transmitted via link 104. Local traffic may flow from L1 node 32 to L2 node 12 via links 104, 106 and 108 and L1 nodes 34 and 36. From there the local traffic may flow to, for example, L2 node 14, or to a node not between parent L2 nodes 10 and 12, for instance L1 node 40.

Figure 5:
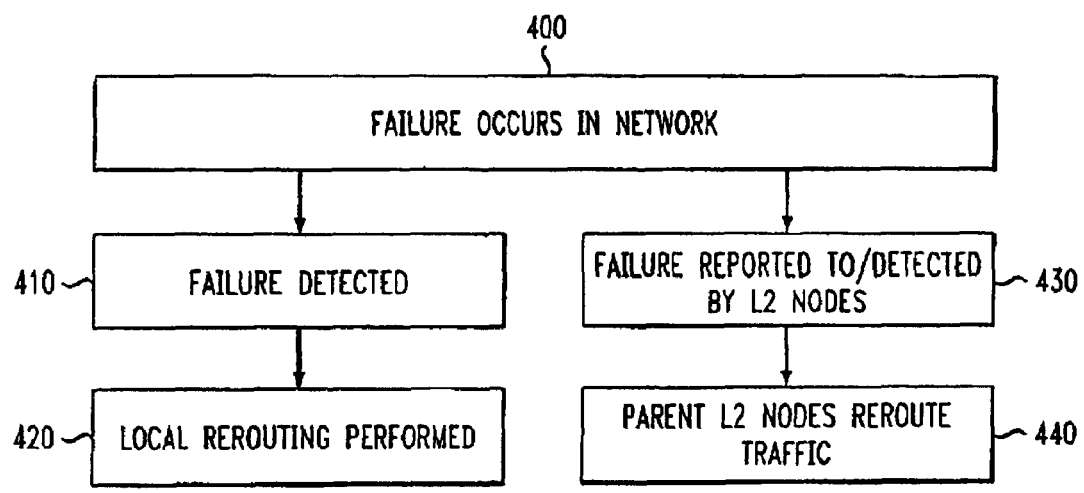
FIG. 5 is a flow chart illustrating error recovery operation of the network of FIG. 3 according to an exemplary embodiment of the present invention.

FIG. 5 is a flow chart illustrating an error recovery operation of network 1 of FIG. 3 according to an exemplary embodiment of the present invention.

In step 400, a failure occurs in network 1. For example, link 104 may be cut, for example by construction activity severing the cable constituting link 104. If link 104 is severed, traffic between node 32 and node 34 may no longer flow directly. Traffic normally sent between node 32 and other nodes via L2 node 12 may not flow via links 104, 106 and 108 and nodes 34 and 36. Express traffic may no longer flow on local path 210. In order for this traffic from L1 node 32 to flow to these destinations, the traffic must be rerouted.

Other events may cause a network failure—for example, a node may fail. If an L1 node fails, an embodiment of the architecture of the present invention recovery may still allow a network to recover. Nodes affected by the failure of an L1 node recover as described, with respect to the failure of a link. Traffic originating or terminating at the failed L1 node may or may not be recovered.

In step 410, the failure is detected by the two nodes directly connected to the link. In the present example, the failure of link 104 is first detected by nodes 32 and 34.

In step 420, each L1 node nearest to the failure (i.e., adjacent to the failure) routes local traffic on the local path on which that node sits to that node's remaining functioning link using a cross-connect. Such traffic includes that originating from or terminating at each adjacent L1 node itself and traffic passing through the adjacent L1 nodes which originates from or terminates at other L1 nodes on the local path. In an exemplary embodiment, each L1 node in a node disjoint path is capable of rerouting, using a cross-connect, all traffic originating from or terminating at all other L1 nodes in that node disjoint path.

The L1 nodes ignore express traffic, which passes through an L1 node without being demultiplexed, altered or rerouted. The failure of link 104 causes express traffic to be rerouted from local path 210 to local paths 220 and 230. The L1 nodes lying on those local paths do not recognize or participate in the rerouting of that express traffic.

In the present example, L1 node 34 redirects local traffic previously carried on failed link 104 onto link 106, using a cross-connect. This rerouted traffic, local to L1 node 34 or L1 node 36, is routed to parent L2 node 12, and reaches its final destination after being routed by one or both of the parent L2 nodes 10 and 12, possibly in combination with other L2 nodes. Rerouting of traffic which is express relative to an L1 node affected by a failure is handled by L2 nodes.

Typically, in a local path, L1 nodes exist which are affected by a failure but which are not adjacent to the failure. In an exemplary embodiment of the present invention, these non-adjacent L1 nodes do not participate in the failure recovery. Affected traffic originating from or terminating at a non-adjacent but affected L1 node is first sent to a node adjacent to the failure (via the original path of the traffic), then is routed by the adjacent L1 node, and then is routed by the parent L2 nodes as described below. Thus traffic originally sent by node 36 to L2 node 10 via links 106, 104 and 102 and nodes 34 and 32 is, after the failure of link 104, first sent to node 34, then turned around by node 34 and sent to L2 node 12 via links 106 and 108 and node 36 itself. In an alternate embodiment, the non-adjacent but affected L1 nodes do participate in error recovery; they reroute traffic local to themselves and may transmit failure information to L2 nodes.

In an exemplary embodiment, nodes not on the local path on which a failure occurs do not need to perform rerouting in response to a failure on that local path. For example, a failure may affect the routing path between the node and a node on the other local path. Prior to the failure of link 104, L1 node 32 and L1 node 38 may have been communicating via a path including links 104, 106, 108 and 120, and L1 nodes 34 and 36 and L2 node 12. Rerouting is performed such that traffic between nodes 32 and 38 still flows via link 120 and L2 node 12. In an alternate embodiment, node 38 may have to reconfigure its routing to accept such traffic via link 122 rather than link 120.

Thus, unlike the case of an existing mesh network having distributed recovery, the L1 nodes in a network according to an exemplary embodiment of the present invention do not need extra multiplexing and cross-connect equipment to reroute express traffic in response to an error. This is because L1 nodes only reroute traffic which is local to, or originates or terminates at, an L1 node in the node's local path. In an existing mesh network using distributed recovery, each node may be called upon to reroute any traffic in the event of a failure. In such a network, there may be no distinction made between express and local traffic. For example, in existing mesh network 300 (FIG. 1), on the failure of link 312, node 308 must reroute traffic originating or terminating at node 308, and in addition may be called upon to reroute traffic arriving at node 308 along link 307 or link 316. That node 308 may reroute any traffic requires node 308 to have a larger cross-connect and extra multiplexing equipment when compared with the L1 nodes in the network of the present invention.

In the network of the present invention, an L2 node may be directly attached to a link which fails. In such a case, the L2 node redirects traffic local to that L2 node (i.e., originating from or terminating at that L2 node) as does an L1 node directly attached to a failed link, and redirects express traffic as discussed in greater detail below.

In an exemplary embodiment, steps 410 and 420 are performed substantially simultaneously with steps 430 and 440.

In step 430, the set of L1 nodes adjacent to the failure of link 104 communicate information on that failure to the L2 nodes bracketing the failure, which are considered the parent L2 nodes of the equipment directly affected by the failure. In an alternate embodiment, L2 nodes may be capable of detecting such errors independently of any reporting via monitoring equipment.

Information on the failure may also be sent to a central bureau (not shown); however, a central bureau is not required for error recovery decisions to take place. In the present example, L1 node 32 and L1 node 34 communicate the failure of link 104 to L2 nodes 10 and 12. If either of the nodes first detecting the error is an L2 node, that node does not report the node to another L2 node, but possibly to a central bureau. Unlike in other error correction systems, a central bureau is not used to redirect traffic in the event of an error. However, the network of the present invention may use a central bureau as a centralized site for keeping track of the status of the network and any error conditions.

In step 440, the L2 nodes considered to be parent L2 nodes relative to the failure respond to the failure by rerouting traffic onto protection capacity. Parent L2 nodes 10 and 12 determine a new routing scheme to allow traffic to flow despite the failure of link 104. Parent L2 nodes 10 and 12 may communicate with each other to coordinate the determination of the new routing scheme; however, such communication is not necessary. Each parent L2 node may have to reroute two types of traffic in response to an error express traffic passing between the pair of L2 nodes and traffic local relative to the L2 node pair affected by the failure.

Figure 2:
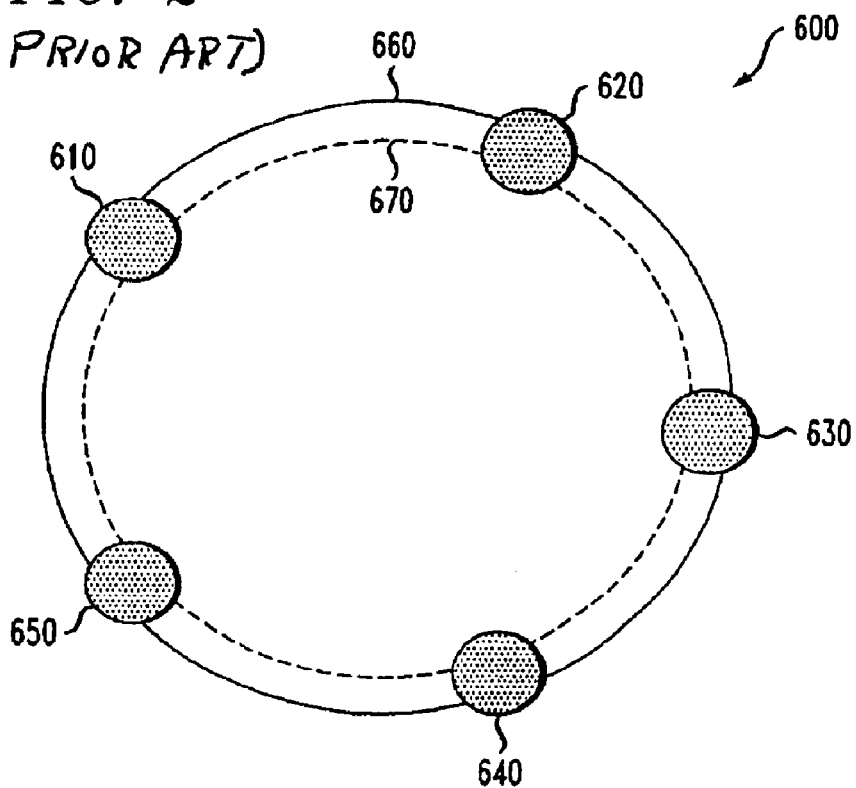
FIG. 2 is a diagram illustrating a simplified portion of a known ring network.

Express traffic normally flows along local path 210 via links including link 104. On the failure of link 104, L2 nodes 10 and 12 reroute this express traffic along the protection capacity of paths 220 and 230. Dividing traffic rerouted in response to an error among more than one recovery path allows each path used for recovery to carry less excess protection capacity than would otherwise be needed. For example, in ring network 600 (FIG. 2), on the failure of links 660 and 670, all traffic flowing between nodes 610 and 620 is rerouted over a series of individual protection links rather than being divided among several protection links. Each protection link must have more capacity, because each such link must be able to handle the bundle of traffic flowing between any two adjacent nodes in its entirety.

Local traffic generally must be rerouted at a local level, that is, by the affected L1 nodes nearest to or adjacent to the failure. For recovery to be complete, however, this local traffic is sent to the parent L2 nodes, which reroute the traffic to flow between the parent L2 node and the other origination or termination point. The L2 node may bundle the traffic with other traffic onto a channel of higher granularity before rerouting the traffic.

In network 1, local traffic flows between L1 node 32 (FIG. 4) and other nodes. Some of this traffic is affected by the failure of link 104 and must be rerouted by L2 nodes 10 and 12. For example, traffic may be flowing between L1 node 32 and L1 node 36 via links 104 and 106. On the failure of link 104, L1 node 32 directs all traffic entering and leaving that node to be routed via link 102 to flow to L2 node 10. L2 node 10 may bundle this traffic onto a channel of higher granularity. L2 node 10 directs this traffic to further flow via path 220 or 230 to L2 node 12 (in the form of express traffic), then to L1 node 34 via links 106 and 108 and L1 node 36. L1 node 34 turns this traffic around and routes it to L1 node 36.

Prior to the failure of link 104, local traffic may have been flowing between L1 node 32 and L1 node 40 via links 104, 106, 108 and a portion of local path 240. On the failure of link 104, L1 node 32 directs traffic entering and leaving that node to be routed via link 102 to L2 node 10. L2 node 10 may bundle this traffic before routing it. L2 node 10 directs this traffic to further flow via path 220 or 230 (in the form of express traffic) to L2 node 12, then to flow to L1 node 40 via local path 240.

Prior to the failure of link 104, local traffic may have been flowing between L1 nodes 32 and 42 via links 104, 106, 108 and 110 and nodes 34, 36 and 12. After the failure of link 104, this traffic is sent to L2 node 10 via link 102, then express routed to L2 node 12 via local paths 220 and 230, and routed to node 42 via link 110. In an alternate embodiment, L1 node 42 may receive such rerouted traffic via link 112, and thus may have to perform local rerouting.

Such rerouting requires L1 nodes and L2 nodes to perform rerouting. However, less equipment and decision making is required for this rerouting than with other error recovery schemes. In the network architecture of the present invention, L1 nodes such as node 32 need less multiplexing and cross-connect equipment than with known distributed recovery systems.

An exemplary embodiment of the present invention uses less cross-connect equipment because express traffic recovery takes place at the L2 level. Unlike in the case of existing mesh networks, L1 nodes do not need cross-connect equipment which is able to "turn around" or otherwise reroute express traffic on a link failure. Furthermore, since the response of an L1 node to an error is limited—send the traffic to the accessible L2 node or nodes bracketing the L1 node—and some L1 nodes may not need to respond to an error, less cross-connect equipment is needed. For instance, in an existing mesh network using distributed error recovery, L1 node 42 may have as various rerouting options demultiplexing express traffic then using a cross-connect to reroute traffic along links 10, 112 or 118. With the hierarchical routing system of the present invention, L1 node 42 does not demultiplex express traffic, but instead reroutes certain traffic to one of L2 nodes 10 or 12 along links 112 or 10. Thus L1 node 42 needs a smaller cross-connect and less multiplexing equipment.

Since L1 nodes do not have to turn around or reroute express traffic, L1 nodes need smaller multiplexers and fewer multiplexers. If an L1 node is to reroute or manipulate traffic, it may require a multiplexer to access that traffic. L2 nodes bundle and un-bundle (multiplex and demultiplex) this express traffic using a multiplexer.

Traffic is recovered in higher level, higher granularity bundles. This reduces the number of multiplexers required at L2 nodes, and lowers the size of cross-connects, when expressed as the number of ports on each cross-connect. Essentially, traffic to be rerouted is bundled (requiring multiplexers) and rerouted (requiring cross-connects) at a relatively small number of L2 nodes. Thus, generally only L2 nodes require equipment (multiplexers and cross-connects) to handle this traffic; nodes where this traffic originates or terminates also require this equipment. This can be contrasted with an existing mesh network where any of the nodes may participate in error recovery.

After the traffic is rerouted, as discussed above, to compensate for the failure, the alternate routing scheme stays in place for the duration of the failure condition. If it is detected that the failure has been corrected, by, for example a repair, the original routing scheme is implemented. The correction of the failure condition may be detected by L1 nodes adjacent to the failure condition or may be communicated to the relevant nodes by notification by human operators. The L1 and L2 nodes which formed an alternate routing scheme to compensate for the error condition, as discussed above, use the same equipment and mechanisms to re-form the original routing scheme. L1 nodes which had turned around local traffic re-establish the original paths for that traffic. L2 nodes which had bundled and rerouted traffic in response to the error condition reroute that traffic to re-establish the original paths. As with rerouting in response to an error condition, this rerouting may take place automatically.

In an alternate embodiment, a central bureau may be used to direct error recovery; routing decisions are made at a central bureau and transmitted to the nodes. Nodes of any level in the hierarchy (e.g., L1 or L2 nodes) report failure conditions to the central bureau. The central bureau assesses the error condition to determine an alternate routing plan, and directs nodes to reroute traffic based on the plan. For the reasons discussed above, such a network makes efficient use of equipment to quickly reroute traffic in response to an error condition. The architecture of such a network allows for a quick formulation of a routing scheme. Node and link equipment is used efficiently and may be reduced when compared to other network architectures.

An embodiment of the present invention may be used in conjunction with ring architecture networks. As discussed above, the architecture of the present invention may be used in conjunction with other network architectures without detrimentally affecting the overall operation or benefits of the network. A ring architecture combined with an embodiment of the present invention may perform error recovery as discussed above. When a failure occurs in the ring, the hierarchical network may delay performing the hierarchical recovery described above to allow the ring sub-network to perform recovery at the ring level. If the ring is unable to recover, the hierarchical network performs error recovery. The ring may be unable to recover if, for example, more than two links in the ring fail.

The network of the present invention allows for more efficient communication and traffic routing during normal operations; i.e., when there is no failure from which the network must recover. During normal network operation, it is desirable to provision and reroute traffic based on changing use patterns and other conditions. The network architecture of the present invention, allowing for rerouting during error recovery using a minimum of equipment, and using simplified decision making, allows for rerouting to alter network traffic patterns for other reasons.

CONCLUSION

Several embodiments of the present invention are specifically illustrated and/or described herein. However, it will be appreciated that modifications and variations of the present invention are covered by the above teachings and are within the purview of the appended claims without departing from the spirit and intended scope of the invention.

Implementations are contemplated which allow for a hierarchy of any number of levels or which include portions which do not have the form of the network as described. For example, portions of the network may operate according to the architecture of the present invention, and other portions of the network may include other architectures. An embodiment of a network according to the present invention may be combined with ring architectures or may include "spurs."

What is claimed is:

1. A method for use in a network that carries traffic over paths comprising high-level and low-level nodes interconnected by links, said traffic including local traffic that is routed by at least one of the low-level nodes and further includes express traffic that is communicated between at least one pair of high-level nodes over a path that includes said at least one of the low-level nodes, said express traffic passing through said at least one of the low-level nodes without being routed by that low-level node, there being at least one other path between said pair of high-level nodes that includes said at least one of the low-level nodes, the method comprising responding to an error condition affecting a link carrying both said local and express traffic by rerouting at least that express traffic around the affected link to its original destination, the rerouting of said express traffic being carried out by at least one of said high-level nodes without being rerouted by any low-level node that lies on any other path between said pair of high-level nodes.

2. The invention of claim 1 wherein the method further comprises responding to said error condition by also rerouting the local traffic around the affected link to its original destination, the rerouting of the local traffic being carried out at least in part by said one low level node.

3. The invention of claim 2 wherein the rerouting of the local traffic is further carried out at least in part by at least one of said high-level nodes.

4. The invention of claim 3 wherein the affected link comprises at least one optical fiber and wherein said local and express traffic are carried on respective different wavelengths within said optical fiber.

5. The invention of claim 2 wherein the affected link comprises at least one optical fiber and wherein said local and express traffic are carried on respective different wavelengths within said optical fiber.

6. The invention of claim 2 wherein the rerouting of said local traffic is further carried out at least in part by at least one of said parent nodes.

7. The invention of claim 6 wherein the affected link comprises at least one optical fiber and wherein said local and express traffic are carried on respective different wavelengths within said optical fiber.

8. The invention of claim 1 wherein the affected link comprises at least one optical fiber and wherein said local and express traffic are carried on respective different wavelengths within said optical fiber.

9. A telecommunications network, said network comprising: a plurality of nodes, and a plurality of links interconnecting the plurality of nodes; wherein:

a subset of the nodes are high-level nodes;

a subset of the nodes are low-level nodes; and the network is configured so that each of one or more of the low-level nodes lies on a first path terminated at one end by a first high-level parent node and at a second end by a second high-level parent node;

the network is further configured so that at least one of said one or more of the low-level nodes lying on said first path also lies on a second path terminated at one end by said first high-level parent node and at a second end by said second high-level parent node;

at least one link on at least said first path carries local traffic that is demultiplexed, altered or rerouted by said one or more low-level nodes and further carries express traffic that is communicated between said parent nodes, and upon the occurrence of an error condition affecting both the local and express traffic carried by said one link, said local and express traffic is rerouted around that error condition, the rerouting of said local traffic being controlled at least in part by at least one of said one or more low-level nodes and the rerouting of said express traffic being controlled by at least one of said parent nodes without being demultiplexed, altered or rerouted by any of said one or more low-level nodes that lie on both said first and second paths.

* * * * *